Nov. 13, 1956  S. H. FAIRWEATHER  2,770,726
FREQUENCY ERROR SENSING AND SIGNAL SYSTEM
Filed Sept. 28, 1953  2 Sheets-Sheet 1
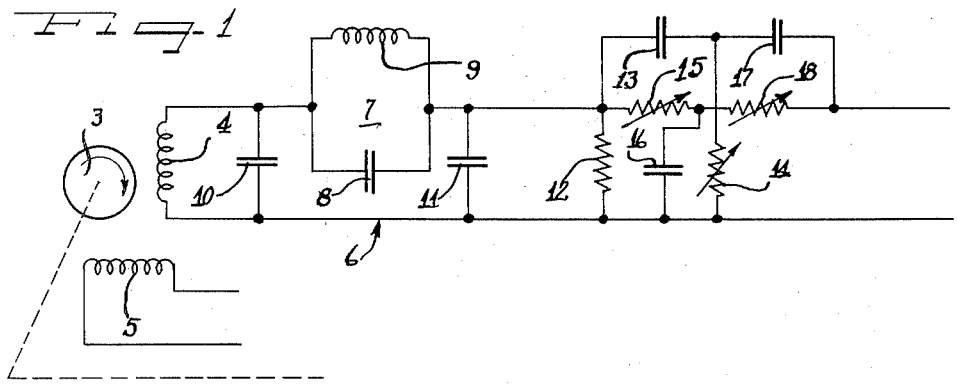
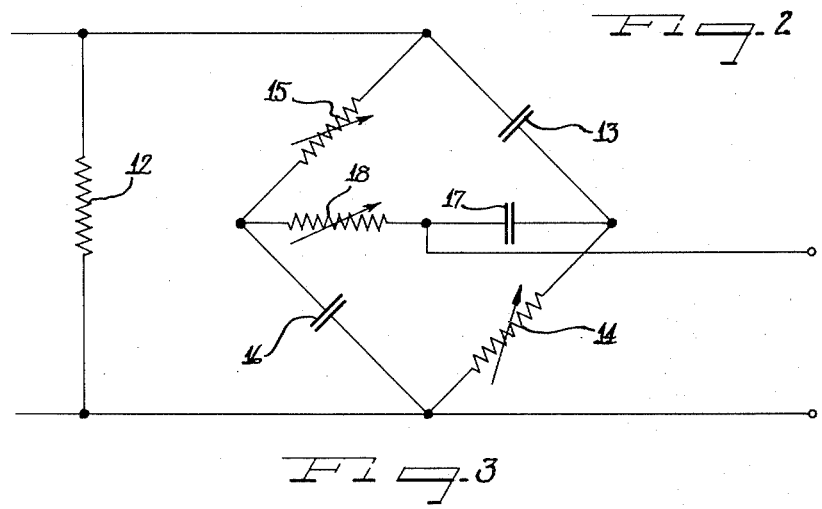
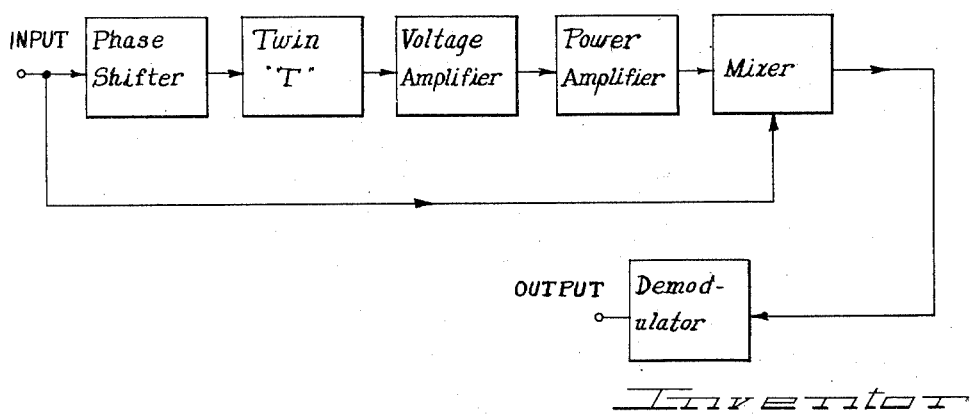
Inventor
Stephen H. Fairweather

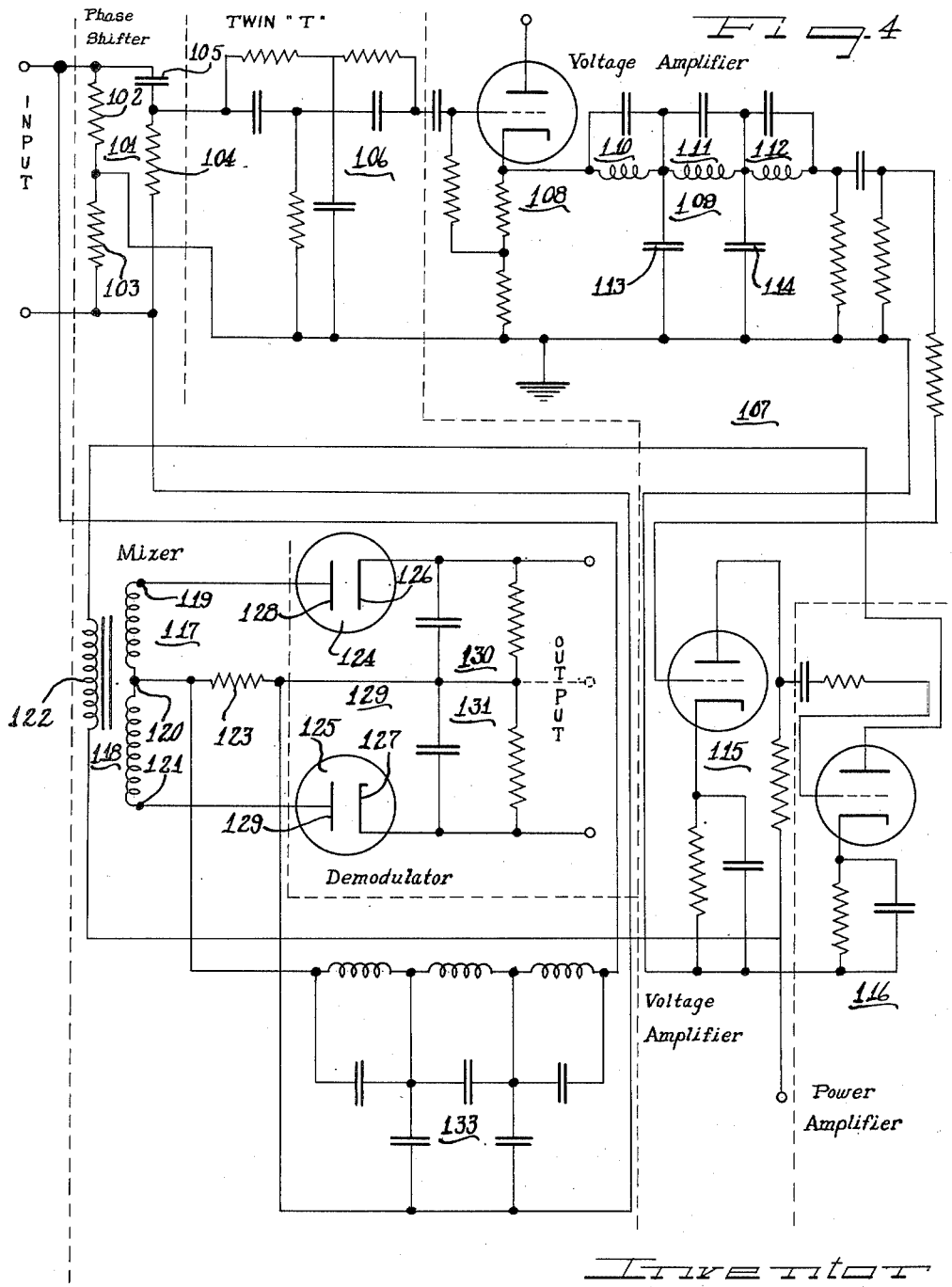

United States Patent Office 2,770,726
Patented Nov. 13, 1956

2,770,726

FREQUENCY ERROR SENSING AND SIGNAL SYSTEM

Stephen H. Fairweather, South Euclid, Ohio, assignor to Thompson Products, Inc., Cleveland, Ohio, a corporation of Ohio Application September 28, 1953, Serial No. 382,584

4 Claims. (Cl. 250—27)

The present invention relates to a frequency error sensing and signal system and more particularly to systems for generating an error signal of direct current characteristics which has an amplitude and sign which are functions of the variation between the input frequency and a proper preselected reference frequency.

Numerous systems attempting to provide such a signal have been attempted in the prior art and some of those are disclosed in my copending application entitled, "Magnetic Speed Sensing System," Serial No. 382,581, filed September 28, 1953.

I have found, however, that although numerous of these systems have met with more or less success that many of the same involve inaccuracies which are obviated by the present invention. By the system of the present invention, there is provided a highly accurate frequency sensing system capable of providing a direct current signal output, the amplitude and sign of which are functions of the error in the input frequency with respect to a proper preselected control frequency. I have found that it is particularly advantageous to employ a frequency bridge type type network and particularly a twin T type frequency bridge network as a frequency discriminating system to feed into other types of rectifying and output stages for the purposes of deriving the desired signal.

Systems embodying the principles of my invention enjoy particular utility in controlling the frequency of operation of parallel power generator, alternator, systems in such assemblies as aircraft power systems or the like. However, it will be appreciated that the system of the present invention is a system of general utility and may be employed wherever it is found desirable to utilize a signal which has its amplitude and sign, a function of the difference between the frequency of the input signal and the proper preselected reference frequency.

It is, therefore, an important object of the present invention to provide a frequency error sensing and signal system providing an output which has a direction and amplitude derived as a function of the difference between the frequency of the input signal and the preselected reference frequency.

Still another object of the present invention is to provide a frequency error sensing and signal system employing a twin T frequency discriminator network operable to have a substantially null output at a preselected reference frequency, which preselected reference frequency may be variably controlled as desired, and which twin T network has an alternating current output, the phase of which is varied plus or minus from 90° depending upon the direction of variation of the frequency of the input from the preselected reference frequency.

Still another object of the present invention is to provide a frequency error sensing and signal system incorporating the several advantages hereinabove described.

Still other objects, features and advantages of the present invention will become readily apparent from the following detailed description of preferred embodiments of the present invention and from the following detailed description of the present invention itself, from the appended claims, and from the accompanying drawings, in which like reference numerals refer to like parts, and in which:

Figure 1 is a schematic illustration of the first preferred embodiment of the present invention incorporating a twin T network as a frequency discriminator;

Figure 2 is a schematic view of a twin T network illustrated as a bridge network for purposes of more efficient explanation and understanding;

Figure 3 is a block diagram of another preferred embodiment of the present invention; and Figure 4 is a full schematic of the preferred embodiment illustrated in block diagram in Figure 3.

Systems embodying the principles of the present invention may derive their input signals from any particular desired source such as the power line, the frequency of which is to be controlled or from a variable frequency generator driven by any source such that if the source is operating at the proper rotational speed then the frequency of the output of the variable frequency generator will be the same as the preselected control reference frequency. In the system of Figure 1, the input is derived from a two-phase variable frequency generator 3 illustrated schematically as being mechanically driven by any particular desired power source, not shown.

The variable frequency input generator of the frequency discriminator system illustrated in Figure 1 is a two-phase generator, one phase of which provides an output to a twin T network which operates as a blocking device with a 90° phase shift at the preselected control frequency and has an output in one direction for input frequency greater than the preselected control frequency and an output in the opposite direction thereto for frequencies below the preselected control frequency. That is, at the preselected frequency to which the twin T network is tuned, by proper selection of the values and character of the resistors and capacitors from which this frequency bridge is made, the output of the network is a null while inputs of frequencies more than or less than the tuned frequency create an output of variable amplitude depending on the frequency shift and of a phase shift more or less than 90° also depending on the frequency shift. More will be said of this hereinbelow.

The two-phase variable frequency generator 3 is illustrated schematically as having a pair of field coils 4 and 5 disposed at 90° with respect to each other to indicate a 90° phase difference in their outputs. A single phase generator with two sets of output leads may be employed together with a network shifting the output of one set 90°. As illustrated, however, the output from the coil 4 is fed to the input terminals of the frequency discriminator circuit. This frequency discriminator network is comprised of an attenuator filter network, indicated generally at 6 on the input side of the frequency discriminator system and a twin T network on the output side of the frequency discriminator. The attenuator filter network 6 is comprised of a tank 7 including a capacitor 8 and an inductor 9 in parallel and coupled to a pair of capacitors 10 and 11, one of which is across the input and the other of which is across the output of the attenuator filter section 6 of the frequency discriminator.

The twin T network is resistively coupled to the attenuator filter network 6 by resistor 12 connected in parallel with the capacitor 11 of the attenuator filter network section 6 of the frequency discriminator. The twin T network 7 is essentially a frequency bridge network wherein the output is taken between one side of the bridge and the center of the center leg of the bridge. Such a bridge is illustrated in Figure 6.

Specifically, the twin T network is comprised of three resistors 14, 15 and 18 and three capacitors 13, 16 and 17 so arranged and interconnected as a pair of interconnected resistance-capacitance T filter networks to form a twin T. One of the T's has a pair of capacitors 13 and 17 in one side of the line and has a resistor 14 connected from a point therebetween to the other side of the line. The other T has a pair of series resistors 15 and 18 connected in parallel with the series capacitors 13, and 17 and has a capacitor 16 connected from a point therebetween to said other side of the line. The output is taken from between a point interconnecting resistor 18 and capacitor 17 and a point interconnecting resistor 14 and capacitor 16. The input is accepted between a point interconnecting the capacitor 13 and the resistor 15 and the point interconnecting the resistor 14 and the capacitor 17.

Generally speaking, the values selected for the several resistors and capacitors of the twin T network will be somewhat as follows:

The several resistors 14, 15 and 18, although indicated as being variable, will be set to a substantially identical value, that is, they will be set so that all three are approximately equal to each other in resistance value; the capacitors 13 and 17 will be of substantially identical capacitance value and the capacitor 16 will have a value of about four times the capacitance of either of the capacitors 13 and 17. With the parameters so selected for the twin T network, the attenuation curve therefor plotted against the frequency proportion of $f/f_0$ ($f$ being the actual input frequency and $f_0$ being the preselected control frequency) on a logarithmic scale will readily illustrate that the attenuation at the preselected frequency is very sharp dropping the output to a minimum. The curves so described are practically flat for ratios somewhat greater or less than unity but are so sharp in attenuation as to reduce the output practically to zero at the preselected frequency. The resistors 14, 15 and 18 may be ganged together if so desired.

This has the effect of giving the twin T network great utility in frequency discriminator systems where it is desirable to eliminate the preselected control frequency from passage through the system. Another important feature of the twin T system is its versitility. By controllably varying the resistors the system may be tuned to any desired frequency.

At frequencies above the preselected frequency the phase of the output of the whole frequency discriminator network hereinabove described will have one sign with respect to a 90° shift and at a frequency below the preselected control frequency the phase of the output from the frequency discriminator network will have an opposite sign with respect to a 90° shift. Thus, the sign of the phase of the output of the frequency discriminator illustrated in Figures 5 and 6 will vary with respect to the output of the coil 5, the second phase of the two-phase generator 3 displaced 90° from the output of the output of field 5. When these two outputs, i. e., the output from the frequency discriminator and the output from the coil 5 are coupled together in a double rectifier and filter system or mixed as with the mixer and demodulation system of Figure 4 hereinafter described, the two outputs above mentioned are superimposed one upon the other and a single output may be obtained which is an error signal having a sign corresponding to the direction of difference between the input frequency and the reference frequency and an amplitude corresponding to the magnitude of that difference.

Operation of the frequency sensing or discriminating system of Figures 3 and 4 is such as to furnish a D. C. signal of one polarity when the frequency of an input thereto is above the preselected frequency for proper control of a speed control servo-motor and to furnish a D. C. signal of the opposite polarity when the frequency of the input falls below the proper control frequency.

The system is supplied at its input with a single phase variable frequency signal which may be supplied by a variable frequency generator or the like with operating characteristics similar to the tacko-generator illustrated in Figure 1. The input also could be supplied from the main power line.

In any event, in the system of Figures 3 and 4, the input signal is split or fed into two parallel paths one of which bridges the first four stages in the system of the other path at the termination of which the two signals are mixed and demodulated or filtered as shown in the last two blocks of the block diagram of Figure 3. The other portion of the input signal is fed to a phase shifter which shifts the phase of that signal with respect to the input 90° as compensation for additional phase shifting effects resulting from the circuitry effects of the twin T.

The input phase shifter is coupled to the twin T stage which stage is substantially identical to the twin T arrangement described above with respect to Figures 1 and 2, so that a signal of the proper control frequency, 400 cycles being most preferable as discussed with regard to the previously considered system, is completely blocked or substantially completely blocked by the twin T network and an output is obtained therefrom only when the frequency of the input signal varies from the proper control frequency.

When the frequency of the input to the twin T network is above the preselected control frequency which is preferably about 400 cycles there will be an output of the twin T network which will have a phase of one sign with respect to the input phase. When the frequency of the input to the twin T selective attenuator network falls below the preselected proper control frequency, then an output will obtain from the twin T network which will have a phase of an opposite sign with respect to the phase of the input signal.

If the control frequency deviates from the proper value therefor then the output from the twin T having a phase sign dependent upon variation between the input frequency and the proper input frequency, is amplified in a voltage amplifier stage and thereafter amplified in a power amplifier stage to provide an input to a mixture stage which is of any preselected design and herein shown in Figure 4 as a transformer with a center tapped secondary. The input signal which bridges the phase shifter, the twin T network, the voltage amplifier and the power amplifier is also fed to the mixer state and, as shown in Figure 4 in the preferred embodiment there illustrated, fed to the center tap of the secondary of the connector transformer. Thereafter, the output signal from the mixer is full wave rectified and filtered so that D. C. output of one sign is present there when the frequency is above the proper control frequency and an output of the opposite sign thereto is present when the frequency of the input is below the proper value therefor.

With specific regard to Figure 4, it will be readily observed that the input is divided into two parallel paths later reunited and mixed as previously described. Part of the input signal goes directly from the input to the mixer stage and the other part goes to a phase shifter. That phase shifter may be of any well known variety capable of shifting the phase of the input signal as above stated, namely 90° as necessary compensation for the phase shifting which occurs in the twin T network in this path of the system.

The phase shifter 101 illustrated in Figure 4 is a resistance-capacitance bridge with three resistors 102, 103 and 104 and a capacitor 105 in a bridge arrangement and is quite satisfactory for performing the stated function.

The output of the phase shifter is coupled directly to a twin T network which operates just as does the twin T network 106 substantially identical to the one described above with regard to Figures 1 and 2 so that there is substantially complete blocking in this leg of the parallel system when the input frequency is at the proper preselected control frequency, preferably about 400 cycles per second. When the frequency varies from the proper preselected input frequency the signal will not be blocked by the twin T but will be modified in accordance with the characteristics of the twin T 106 such that its phase will be further shifted to plus or minus with respect to the original input signal in accordance with the variations in the frequency from the proper input frequency as a function of that variation.

With an existing condition where the input frequency is different from that which is preselected as the proper frequency, there is an output from the twin T network which is fed directly to a voltage amplifier stage 107.

The input side of the voltage amplifier stage is comprised of a cathode follower system 108 and a filter network 109. This filter network is tuned to suppress second and third harmonics of the proper control frequency as they may come through the network unaffected or substantially unaffected or unblocked by the twin T network 106. Further, this filter network 109 also serves to block or attenuate shock pulses such as those that occur when the line is suddenly loaded or unloaded as in the case of switching on and/or off systems connected to the main power line which may effect such variations in the frequency applied to the input here in this system for supplying an error signal which may be used to correct the frequency variation.

The filter network 109 is preferably comprised of three series-connected tanks 110, 111 and 112. The two outside tanks 110 and 112 are turned to the second harmonic of the proper preselected control frequency, preferably about 800 cycles, and the central tank, 111, is tuned to about 1200 cycles, the third harmonic of the proper preselected control frequency. The interconnection points between the first tank and the second tank and between the second tank and the third tank are capacitively coupled by capacitors 113 and 114 to the other side of the line, which may be grounded if desired, to by-pass second and third harmonics.

A simple voltage amplifier 115 follows the filter network and forms the remainder of the voltage amplifier stage. Thereafter, the signal output from the voltage amplifier stage is fed to a power amplifier stage which operates in accordance with well known principles and characteristics of operation.

The power amplifier stage 116 is loaded by a transformer 118 which forms part of preferred mixer stage 117 for the preferred embodiment of the present invention illustrated in Figure 4. The outside terminals 119 and 121 of the secondary of the transformer 118, the primary 122 of which is connected into the power amplifier stage 116, are connected to the plates 128 and 129 of a pair of diodes 124, and 125, respectively, for full wave rectification of the signal as further described below. The center tap 120 of the secondary is connected to one end of a resistor 123. The other end of the resistor 123 is coupled to the cathodes 124 and 125 of the diode rectifiers through the resistance-capacitance filters 130 and 131.

The resistor connected to the center tap of the mixing transformer is connected to the line from the input in front of the phase shifter and thus has a voltage impressed thereacross which is out of phase with the voltage across the secondary of the transformer measured plus or minus by the variation in the phase of this latter voltage effected due to frequency variations in the input and the sensing thereof by the twin T.

There is also connected into the bridging lines between the input terminals and the mixer resistor, a filter network 133 of substantially identical parameters to the parameters of the filter network 109 between the voltage amplifier 115 and the cathode follower 108. The function of this second filter network is substantially identical to that of the first described filter network in that it substantially blocks second and third harmonics of the proper input frequency and serves to attenuate pulses or shocks in the input voltage wave form. By this inclusion of a second filter network in the system and specifically in the bridging line the only variation between the output of the bridging line and the output of the stages bridged thereby lies in the phase shift due to frequncy variation in the input signal, the sign of that shift being either plus or minus in accordance with an increase or decrease of the frequency of the input with respect to the proper input frequency.

Thus, it can be seen from an inspection of the mixer stage portion 117 and the demodulator stage 129 of the circuit of Figure 8 that when there is a variation between the input frequency and the proper in-put frequency, there will be a variation between the phase of the signal impressed upon the resistor and the phase signal impressed upon the secondary of the transformer connected to the power amplifier stage above described.

If the frequency of the input signal is, for example, above the preferred 400 cycle then the phase relation between the voltage across the resistor 123 of the mixer and that across the secondary of the transformer will be such that the voltage across one of the filter networks 130, 131 will be greater than that across the other thereof and there will be an output from the demodulator or rectifier filter stage which will have one given sign or direction. If the input frequency is below the preferred 400 cycle proper input control frequency then the latter of the filter networks will have a higher voltage thereacross than the former and there will be an output from the demodulator or rectifier and filter network which will be opposite in sign to that described above. It will be understood, also that the amplitude of the output D. C. is a function of the variation between the input frequency and the proper input frequency. That is, the amplitude of the output of this system is a function of frequency variation since the output of the mixer stage is a function of the phase difference between the signals fed thereto.

Further, an analysis of the mixer stage and of the demodulator and the rectifier and filter stage will clearly show that in the two terminal outputs illustrated there will be no voltage if the frequency of the input is precisely the preferred 400 cycle proper input control frequency. If a three terminal output is desired, and the same is illustrated by a broken line indication of a third terminal at the center of the filter network of the modulator or rectifier stage, then it will be evident that outputs equal in amplitude and of opposite sign may obtain from across opposite halves of the output terminal network when the input frequency is the proper input control frequency.

While I have shown certain preferred embodiments of my invention, it will, of course, be understood that I do not wish to be limited thereto since many modifications may be made, and I, therefore, contemplate by the appended claims to cover all such modifications as fall within the true spirit and scope of my invention.

I claim as my invention:

1. A frequency error sensing and signal system deriving its input from a variable frequency source, variations in the frequency of which serve as the error to be sensed, comprising a phase shifter, a twin T network fed by said phase shifter, a cathode follower fed by said twin T network, a delay line network fed by said cathode follower, energy coupling means fed by the input to the phase shifter and also by the output from the delay line network, and an energy comparing means fed by said energy coupling means.

2. A frequency error sensing and signal system as set forth in claim 1 wherein an amplifier couples said delay line network and said energy coupling means whereby it is fed by said delay line network and feeds said energy coupling means.

3. A frequency error sensing and signal system as set forth in claim 1 in which a second delay line network couples said energy coupling means and the input to said phase shifter whereby it is fed by the signal to said phase shifter and feeds said energy coupling means.

4. A frequency error sensing and signal system as set forth in claim 1 in which said comparing means includes balanced opposed output elements fed by said energy coupling means to provide an output signal variable in sign and amplitude as a function of variations in the input from a preselected frequency.

References Cited in the file of this patent
UNITED STATES PATENTS

| | | |
|---|---|---|
| 2,243,417 | Crosby | May 27, 1941 |
| 2,323,609 | Kihn | July 6, 1943 |
| 2,585,532 | Briggs | Feb. 12, 1952 |